United States Patent Office 3,314,343
Patented Apr. 18, 1967

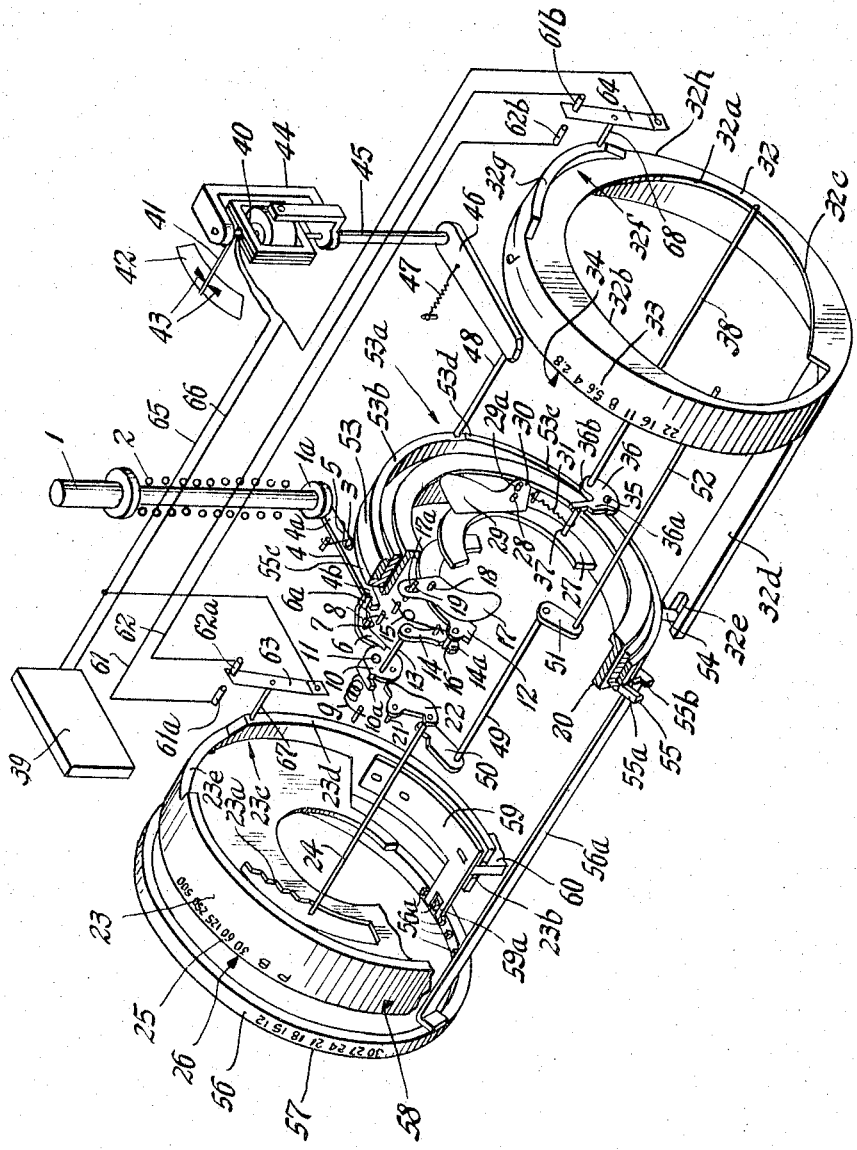

3,314,343
PHOTOGRAPHIC CAMERA WITH SETTING MEANS FOR EXPOSURE TIME AND DIAPHRAGM AND HAVING AN EXPOSURE METER AND A COOPERATING RESETTING DEVICE
Waldemar T. Rentschler, Calmbach (Enz), Germany, assignor to Alfred Gauthier, G.m.b.H., Calmbach (Enz), Germany, a corporation of Germany
Filed Oct. 22, 1963, Ser. No. 318,010
Claims priority, application Germany, Oct. 27, 1962, G 36,243
6 Claims. (Cl. 95—10)

This invention relates to photographic cameras having controllable speed shutters and controllable diaphragms. In particular the invention relates to means for interconnecting the shutter speed and diaphragm controls of of the camera with an exposure meter so as to facilitate the setting of exposure parameters.

It is a principal object of this invention to provide a simple camera structure in which exposure settings may be made semiautomatically by manually presetting at least one of the controls to determine one of the exposure parameters and subsequently setting the other control member to determine the other exposure parameter with reference to an interconnected exposure meter, the mechanism being so constructed as to offer the additional possibility of semiautomatic selection of both exposure parameters.

In accordance with the invention the shutter speed control and the diaphragm aperture control are provided with their usual setting scales. In addition one of the controls is provided with an additional setting position while the other control is provided with an additional setting range which corresponds to the additional setting position of the first control. When both controls are set to their additional setting position, and setting range, respectively, cams which form a part of the invention become operative and are connected to the two controls and to the exposure meter. Thereafter the control having a P setting range can be adjusted to bring about a predetermined exposure meter setting through the operation of the resetting device.

As a result of the invention, a photographic camera has been created which makes possible a selective setting to many different exposure settings but without correspondingly increasing the complexity of the camera mechanism. Quite apart from the well-known conventional manual setting of the two exposure parameters, the exposure setting in a camera constructed according to the present invention can be effected by first setting either the shutter speed or diaphragm aperture to a selected point on its setting scale and then setting the other parameter, either the diaphragm or shutter speed in accordance with a resetting arrangement. In addition a camera constructed according to the present invention also makes it possible to set the two exposure parameters according to a predetermined time-diaphragm program by cooperation with the resetting device. In the latter case the photographer is not obliged to refer to specific scale values but only need operate one setting member of the camera. The proper setting is indicated on the dial of the exposure meter when the needle thereof reaches a specified mark. In addition, it is important that no additional setting members are required for selecting the different exposure settings; the camera can be operated with reference only to the usual number of controls, one for the shutter speed and the other for the diaphragm. Very little additional structure within the camera is required, and the operation of the controls remains very simple.

In a particular form of the invention, cams which influence the shutter speed and diaphragm controls are formed on the control that carries the additional P setting range while the carrier of the cam that cooperates with the resetting device may be in the form of a ring that is part of a differential device which is arranged between the shutter speed and diaphragm controls and which can be connected to the control that has the additional P setting range. In particular the ring, which can be connected to the setting member having the additional P setting range, may be mounted on a second ring in such a way as to be secured against relative axial movement with respect to the second ring, the latter being so connected to the control that has the additional P setting position that it may be axially displaced in response to the rotary motion of the latter control by virtue of a control device between the second ring and a fixed structure on which the second ring is mounted.

In order to increase the dependability of operation of the camera the invention further provides a locking or warning device, which is associated with the shutter speed and diaphragm controls and which gives a positive warning when these controls are set in positions or ranges that do not correspond to each other.

As a further means of simplifying and improving the operation of the camera the invention includes switching means connected with the exposure meter and preferably arranged to short circuit the output signal of the exposure meter when the settings of the controls are not correct.

The invention will be further described in conjunction with the following specification taken together with the drawing which shows a perspective, expanded view of the invention with components stretched out in the direction of the optical axis of the shutter.

The mechanism in the drawing includes a shutter release trigger 1 which operates against the force of a compression spring 2 and which is guided in a camera case or housing of any suitable type (not shown in the drawing). At the lower end of the trigger 1 is a collar or flange 1a which engages one arm 4a of a release lever 4 mounted on a pin 3. A spring 5 holds the arm 4a up against the flange 1a at all times. Another arm 4b engages a lug 6a extending from an arresting lever 6 which is pivotally mounted on a pin 7 and is forced into engagement with an arm 4b by a spring 8. The purpose of the lever 6 is to retain a main driving disc 10 in cocked position against the action of a driving spring 9. The disc 10 is affixed to a cocking shaft 11 which is connected to a cocking device in a manner well-known in the art. The cocking device may be, for example, the film transport mechanism of the camera.

The driving disc 10 actuates a shutter blade driving member in the form of a ring 12 and is connected thereto by means of a driving pawl 14 mounted on a pivot pin 13. The pawl is provided with jaws 14a that embrace a pin 16 on the ring 12 and are held in contact with the pin by a spring 15. In actual practice more than one shutter blade 17 is connected to the ring 12, but for the sake of clarity, only one such blade is shown in the drawing. Each of these blades is mounted on a separate pivot pin 18 and is provided with a slot 17a that fits over a fixed pin 19 so that when the driving disc 10 rotates counterclockwise in running-down, the shutter blades 17 are pivoted first in a direction to open the shutter and then in the opposite direction to close it again.

Means to control the exposure time are arranged in a shutter housing 20. Such means comprise an escapement mechanism which includes a breaking lever 22 pivotally mounted on a fixed pin 21 so as to cooperate in the usual way with a lug 10a on the driving disc 10, thereby delaying, to a greater or lesser extent, the rotation, or running-down, of the driving disc 10 during the open position of the shutter blade. A stepped cam 23a is provided on an exposure time setting member, or shutter speed control, 23 to set the arresting lever 22. A fixed pin 24 on the lever 22 engages the cam 23a. The shutter speed control 23 has an exposure time, or shutter speed, scale 25 which includes the values of shutter speed of which the shutter is capable. In the present embodiment speeds from $\frac{1}{30}$ second to $\frac{1}{500}$ second are indicated, as well as a mark B for making B-exposures. The scale 25 is set with reference to a fixed mark 26.

The shutter mechanism also has an iris diaphragm which can be set at various aperture sizes. The diaphragm comprises an actuating ring 27 coaxial with the ring 12 and provided with a plurality of pins 28 on which a plurality of diaphragm lamellae 29 is mounted. Each of the lamellae has a slot 29a which engages a fixed pin 30, and the actuating ring 27 is biased by a spring 31 which pulls the ring in the counterclockwise direction toward its initial position which, as indicated in the drawing, corresponds to the largest diaphragm aperture. The lamellae 29 may be set by means of a diaphragm control, or setting member, 32 which may be mounted for rotation on the rear or back side of the shutter housing 20. The diaphragm control 32 has a scale 33 on which all of the aperture values of which the diaphragm is capable are indicated. In the present embodiment values from 2.8 to 22 are shown. The diaphragm aperture may be set for adjusting the scale 33 with reference to a fixed setting mark 34. Means in the form of a bell-crank lever 36 pivotally mounted on a shaft 35 connect the diaphragm control 32 to the diaphragm ring 27 and thence to the lamellae 29. A pin 37 extending from the ring 27 engages one arm 36a of the lever 36 due to the pressure of the spring 31, while a second arm 36b carries a pin 38 that rides against a cam 32a on the diaphragm control 32. The two independently movable controls 23 and 32 for shutter speed and diaphragm can be coupled, by means referred to as a resetting device, to an exposure meter which is either built into or attached to the camera. For this purpose an indicator needle or tracing pointer 41 is attached to a moving coil 40 of the exposure meter so that when the exposure time and diaphragm are correctly set in accordance with the available light, the indictator needle is located between two marks 43 that are visible through a viewing window 42. The coil 40 is rotated by means of current from a photocell 39 and is positioned in a frame 44 which is mounted on a rotatable shaft 45. A lever arm 46 extends from the shaft 45 and is held, by means of a spring 47, against a transmission pin 48 which is displacable in the direction of the optical axis of the shutter. The pin 48 cooperates with a differential device, as will be described in detail hereinafter and is operatively connected to the shutter speed control 23 and to the diaphragm aperture control 23.

The exposure setting is carried out by first selecting either the desired shutter speed or the desired diaphragm value by means of the appropriate control 23 or 32. After the first of these controls is set, the other is then set to a correlated value determined by the amount of light present and indicated when the second-set control reaches a position which causes the needle 41 to move to the proper location between the fixed marks 43.

The invention also provides means for making exposure settings with the aid of the resetting mechanism 41–46 even without using the shutter speed scale 25 or the diaphragm aperture scale 33. This is accomplished by providing an additional setting position identified, for example, by the letter P for one of the two controls 23 or 32 and an additional setting range which is also designated by the letter P for the other of the latter two controls. In addition the control that is marked with a P setting range is operatively connected to means, such as cams, which influence the braking device, or lever, 22 of the escapement mechanism as well as the diaphragm actuating ring 27 when one of the controls is set to its P setting position and the other control is set within its P setting range. The cams that control the braking lever 22 do so in reference to the actuation of the resetting device 41–46.

In order to give a specific example, the P setting position is located on the shutter speed control 23 while the P setting range is located on the diaphragm aperture control 32. However, this arrangement may be reversed with the P setting position on the diaphragm control 32 and the P setting range on the shutter speed control 23.

Cams 32b and 32c on the diaphragm control 32 control the braking lever 22 of the escapement mechanism and the diaphragm actuating ring 27 when the diaphragm control is within the P setting range. The cam 32b is connected to the braking lever 22 by a linkage including a rotatable shaft 49 having, at one end, a lever arm 50 that engages the pin 24 of the braking lever and, at the other end, a lever 51 provided with a cam follower pin 52 that engages the cam 32b. The braking lever is biased by a conventional spring (not shown in the drawing) which tends to retain the braking lever in the initial position, as shown in the drawing, which is the position for the longest, timed exposure. In the embodiment shown this is $\frac{1}{30}$ of a second. As may be seen, this starting position of the braking lever 22 is also the same when the shutter speed control 32 is placed in the P setting position.

The cam 32c is connected to the diaphragm actuating ring 27 by a linkage which includes the lever 36 and its pin 38 which serves as a cam follower bearing against the came 32a.

The cams 32b and 32c are so shaped as to effect the setting of exposure parameters according to a time/diaphragm program which is such that, in the present embodiment, the P setting range starts with the combination of a shutter speed of $\frac{1}{30}$ second and a diaphragm aperture of 2.8 and ends with a shutter speed of $\frac{1}{500}$ second and a diaphragm of 22. However, in order to use supersensitive film material, appropriate measures can be taken to extend the time-duration combinations to $\frac{1}{1000}$ second or $\frac{1}{2000}$ second, both at diaphragm apertures of 22.

In order to be able to correlate the shutter speed control 23 and the diaphragm aperture control 32 with the resetting needle 41, a member 53 is provided in the form of a ring which is arranged coaxially with the shutter speed and diaphragm controls and is connected to the diaphragm control 32 to be driven thereby. In this case the connection includes an axially extending arm 32d on the control 32. The arm 32d has a forked end 32e that embraces a pin 54 on the ring 53. The ring 53 is so formed that its front surface facing the control 32 is preferably shaped so that it can be utilized as a cam 53a. The transmission pin 48 is forced against the cam by the pressure of the spring 47 acting on the lever 46 so that, as the ring 53 is turned, the convolutions of the cam are transmitted through the lever 46 to the axle 45. The cam 53a is divided into sections of differing slope identified by reference numerals 53b, 53c, and 53d. These are so arranged that the uniformly ascending cam section 53b is in contact with the pin 48 all of the time that the diaphragm control 32 is positioned so that some part of its scale 33 is opposite the setting mark 34. The cam section 53c is placed opposite the pin 48 when the control 32 is oriented so that its P setting range is opposite the pointer 34. The third cam section 53d is between sections 53b and 53c and corresponds in length to the distance between the scale 33 and the P setting range. As may be seen in the drawing, the P setting range of the diaphragm control 32 begins with the diaphragm lamellae 29 in the position of the largest diaphragm value of 2.8 which is the same value as the nearest position on scale 33. As stated above the shutter speed is $\frac{1}{30}$ second for the P setting position of the control 23.

The ring 53 is rotatably mounted on a second ring 55 so as to rotate freely with respect thereto. The ring 55 has a flange 55c which prevents the ring 53 from moving axially in one direction with respect to the ring 55 while the ring 53 is prevented from moving in the other axial direction by the moving pressure of the spring 47 acting through the pin 48. The latter in turn may be moved axially, taking with it the ring 53, by means of a control device which may take the form of a multiple thread engagement the inner surface of the ring 55 and the outer surface of the shutter housing 20.

The ring 55 of the differential device has a radially extending arm 55a with a forked end 55b that engages an arm 56a extending from a film sensitivity setting control 56. This control can be set by bringing a selected section of a film sensitivity scale 57 opposite an indicator mark 58 on the shutter speed control 23. The sensitivity control 56 can be locked with respect to the shutter speed control 23 by any convenient means, such as the locking structure which is shown in the drawing and which includes a leaf spring 59 attached to the inner wall of the control 23. The free end 59a of the spring is forked so as to engage any of the protuberances 56a spaced along the inner perimeter of the control 56. These protuberances correspond to the markings of the scale 57.

The coupling device is actuated by means of a push-button 60 that extends through an opening 23b in the wall of the shutter speed control 23 and, when depressed, lifts the forked end 59a away from the protuberances 56a to permit relative rotation of the control 56 with respect to the control 23.

The electrical circuit connecting the photocell 39 to the moving coil 40 includes switching means capable of selectively short-circuiting the photocell. The short-circuiting means includes a pair of leads 61 and 62 which terminate at one end in fixed contacts 61a and 62a and at the other end in contacts 61b and 62b, respectively. The contacts 61a and 62a are associated with the shutter speed control 23 while the other contacts 61b and 62b are associated with the diaphragm control 32. A contact blade 63, which, together with the contacts 61a and 62a, forms a double throw switch, is placed between the contacts 61a and 62a to make contact with one of the other of them alternately. Similarly a blade 64 is located between the contacts 61b and 62b to form therewith a second double throw switch. The leads from the photocell 39 to the coil 40 are identified by reference characters 65 and 66 and the blade 63 is attached to the lead 65 while the blade 64 is attached to the lead 66. A pin 67 serves as a cam follower between the contact blade 63 and the cam 23c while a similar pin 68 serves as the cam follower connecting the contact blade 64 to the cam 32f.

With the controls 23 and 32 set as shown in the drawing, the contact blades 63 and 64 are pressed against the fixed contacts 62a and 61b by the sections 23d and 32g of the cams 23c and 32f respectively. Thus the leads 65 and 66 connected to the blades 63 and 64, respectively, are not short-circuited together and so the current developed by the photocell 39 is able to energize the coil 40. On the other hand if the shutter speed control 23 is set to its additional P setting position, the lower section 23e of the control cam 23c is brought opposite the cam follower pin 67 and as a result the blade 63 is free to move to the left under its own spring action so as to make contact with the fixed contact 61a. This short-circuits the lead 65 to the lead 66 by way of the lead 61 but if the diaphragm control 32 is also moved to its P setting range the lower section 32h of the cam 32f is brought opposite the cam follower pin 68, permitting the contact blade 64 to move from the fixed contact 61b to the fixed contact 62b and thereby breaking the short-circuit between the leads 65 and 66. By analogy, the short-circuit may be made through lead 62 if the diaphragm control 32 is moved to its P setting range while the shutter speed control is kept in a position in which some portion of the scale 25 is opposite the pointer 26.

Thus, as may be seen, there is a short-circuit contact device or arrangement which is governed by the controls 23 and 32 and which, when the two controls are set at non-corresponding setting positions or ranges, short-circuits the output of the photocell 39 (or input of the coil 40). When this occurs, the coil 40 returns to a predetermined starting position, which may be, for example, against a fixed stop in response to the force of the customary restoring spring (not shown in the drawing) that acts on the coil 40. In this position the resetting needle 41 is outside of the viewing window 42.

The operation of the above described camera is as follows:

1. Setting of the film sensitivity

In order to set the film sensitivity the connection between the shutter speed control 23 and the film sensitivity control 56 is released by pressing on the push-button 60. Thereafter the film sensitivity control 56 may be set to the proper value indicated on the scale 57 in conjunction with the setting mark 58 in accordance with the speed of the film being used in the camera.

2. Setting of a shutter speed diaphragm aperture ratio with preselection of one of the exposure parameters In many instances it will be known that the photograph should be taken at a certain shutter speed in order to record a desired action. Thus the control 23 may be set by placing the proper point of the scale 25 opposite the fixed mark 26. Thereafter the diaphragm control 32 may be set by rotating it to bring the resetting needle 41 into position between the two fixed marks 43 as illustrated in the drawing. This is the proper position for setting the shutter speed diaphragm aperture ratio according to the prevailing light conditions and to the film sensitivity. The same result may be reached by setting the diaphragm aperture control 32 first and then rotating the shutter speed control 23 to bring the needle 41 into position between the marks 43.

3. Setting the shutter speed diaphragm aperture ratio according to a predetermined program All that is necessary to accomplish an automatic setting of the camera is to place the exposure time setting member 23 in its P setting position, as indicated by placing the mark P opposite the fixed pointed 26 and to place the diaphragm control 32 in its P setting range, which may be done either before or after the control 23 is placed in its P setting position. Thereafter, the diaphragm aperture control 32 must be moved until the resetting needle 41 is brought into position between the marks 43. If only one of the controls 23 or 32 is placed in its P setting position or range, the photographer will be aware of this because of the fact that the resetting needle 41 will disappear from the viewing winding 42 as a result of the short-circuit contact device.

What is claimed is:

1. In a photographic camera, a shutter mechanism comprising: a shutter blade; a variable aperture diaphragm; driving means connected to operate said shutter blade; a shutter speed control connected to said driving means to control the speed of operation of said shutter; a shutter speed scale associated with said shutter speed control to indicate the operating speed of said shutter; a diaphragm control to vary the size of the aperture of said diaphragm; a scale associated with said diaphragm control to indicate the aperture value of said diaphragm aperture; a resetting device comprising an exposure meter comprising a photosensitive device and first and second members movable with respect to each other in response to light striking said photosensitive device and linkage means controlling the position of one of said members, said members comprising an indicator member and a frame member; a first one of said controls having an additional setting position beyond the scale associated therewith and a second one of said controls having additional setting range beyond the scale associated therewith; a plurality of cams connected to said second one of said controls to be controlled thereby and to control said driving means and said diaphragm when said second control is to its additional range; a second set of cams, a first cam of said second set being connected to said first control to be actuated thereby, a second cam of said second set being connected to said second control to be actuated thereby, said cams of said second set being connected together whereby actuation of one of said cams of said second set actuates the other of said cams of said second set; and means connecting said linkage means to said second set to be controlled in response to the combined setting of both of said cams of said second set to set said indicator member to a predetermined position.

2. In a photographic camera, a shutter mechanism comprising: a shutter blade; a variable-aperture diaphragm; driving means connected to operate said shutter blade; a shutter speed control connected to said driving means to control the speed of operation of said shutter; a shutter speed scale associated with said shutter speed control to indicate the operating speed of said shutter; a diaphragm control to vary the size of the aperture of said diaphragm; a scale associated with said diaphragm control to indicate the aperture value of said diaphragm aperture; a resetting device comprising a photosensitive device, and first and second members movable with respect to each other in response to light striking said photosensitive device, and linkage means controlling the position of one of said members, said members comprising an indicator member and a frame member; said shutter speed control having an additional setting position beyond the scale associated therewith, said diaphragm control having an additional setting range beyond the scale associated therewith; a plurality of cams connected to said diaphragm control to be controlled thereby and to control said driving means and said diaphragm when said diaphragm control is set to its additional setting range; a second set of cams, a first cam of said second set being connected to said first control to be actuated thereby, a second cam of said second set being connected to said second control to be actuated thereby, said cams of said second set being connected together whereby actuation of one of said cams of said second set actuates the other of said cams of said second set; and means connecting said linkage means to said second set to be controlled in response to the combined setting of both of said cams of said second set to set said indicator member to a predetermined position.

3. In a photographic camera, a shutter mechanism comprising: a shutter blade; a variable aperture diaphragm; driving means connected to operate said shutter blade; a shutter speed control connected to said driving means to control the speed of operation of said shutter; a shutter speed scale associated with said shutter speed control to indicate the operating speed of said shutter; a diaphragm control to vary the size of the aperture of said diaphragm; a scale associated with said diaphragm control to indicate the aperture value of said diaphragm aperture; a resetting device comprising a photosensitive device, and first and second members movable with respect to each other in response to light striking said photosensitive device, and linkage means controlling the position of one of said members, said members comprising an indicator member and a frame member; a first one of said controls having an additional setting position beyond the scale associated therewith; and a second one of said controls having additional setting range beyond the scale associated therewith; a plurality of cams connected to said second one of said controls to be controlled thereby and to control said driving means and said diaphragm when said first and second controls are set to their additional setting position and additional setting range respectively; a differential device comprising first and second rings and cam surfaces thereon; a connection from said first ring to one of said controls to control said first ring; a second connection from the other of said controls to move said second ring with respect to said first ring, said cam surface on said first ring engaging said second ring to move said second ring when said one of said controls moves; and follower means connecting said cam surface on said second ring to said linkage means to control the setting of said indicator member in response to said differential device and light striking said photosensitive device.

4. In a photographic camera, a shutter mechanism comprising: a shutter blade; a variable aperture diaphragm; driving means connected to operate said shutter blade; a shutter speed control connected to said driving means to control the speed of operation of said shutter; a shutter speed scale associated with said shutter speed control to indicate the operating speed of said shutter; a diaphragm control to vary the size of the aperture of said diaphragm; a scale associated with said diaphragm control to indicate the aperture value of said diaphragm aperture; a resetting device comprising a photosensitive device, and first and second members movable with respect to each other in response to light striking said photosensitive device, and linkage means controlling the position of one of said members, said members comprising an indicating member and a frame member; a first one of said controls having an additional setting position beyond the scale associated therewith and a second one of said controls having additional setting range beyond the scale associated therewith; a plurality of cams connected to said second one of said controls to be controlled thereby and to control said driving means and said diaphragm when said first and second controls are set to their additional setting position and additional setting range respectively; a differential device comprising first and second rings, and first and second cam surfaces thereon, respectively, said second ring being mounted on said first ring to engage said first cam surface to be moved axially thereby and to be freely rotatable with respect to said first ring; a connection from said first ring to one of said controls to rotate said first ring; a second connection from the other of said controls to rotate said second ring with respect to said first ring and cam-follower means connected to said linkage means to engage said second cam surface and control the setting of said indicator member in response to said differential device and light striking said photosensitive device.

5. In a photographic camera, a shutter mechanism comprising: a shutter blade; a variable aperture diaphragm; driving means connected to operate said shutter blade; a shutter speed control connected to said driving means to control the speed of operation of said shutter; a shutter speed scale associated with said shutter speed control to indicate the operating speed of said shutter; a diaphragm control to vary the size of the aperture of said diaphragm; a scale associated with said diaphragm control to indicate the aperture value of said diaphragm aperture; a resetting device comprising a photosensitive device, and first and second members movable with respect to each other in response to light striking said photosensitive device, and linkage means controlling the position of one of said members, said members comprising an indicator member and a frame member; a first one of said controls having an additional setting position beyond the scale associated therewith and a second one of said controls having an additional setting range beyond the scale associated therewith; a plurality of cams connected to said second one of said controls to be controlled thereby and to control said driving means and said diaphragm when said second control is set to its additional setting range; a second set of cams, a first cam of said second set being connected to said first control to be actuated thereby, a second cam of said second set being connected to said second control to be actuated thereby, said cams of said second set being connected together whereby actuation of one of said cams of said second set actuates the other of said cams of said second set; means connecting said linkage means to said second set to be controlled in response to the combined setting of both of said cams of said second set to set said indicator member to a predetermined position; and a warning device connected to both of said controls to indicate when one of said controls is set to a position within its associated scale and the other of said controls is set to a position beyond its associated scale.

6. In a photographic camera, a shutter mechanism comprising: a shutter blade; a variable-aperture diaphragm; driving means connected to operate said shutter blade; a shutter speed control connected to said driving means to control the speed of operation of said shutter; a shutter speed scale associated with said shutter speed control to indicate the operating speed of said shutter; a diaphragm control to vary the size of the aperture of said diaphragm; a scale associated with said diaphragm control to indicate the aperture value of said diaphragm aperture; a resetting device comprising a photosensitive device, and first and second members movable with respect to each other in response to light striking said photosensitive device, and linkage means controlling the position of one of said members; said members comprising an indicator member and a frame member; said shutter speed control having an additional setting position beyond the scale associated therewith, said diaphragm control having an additional setting range beyond the scale associated therewith; a plurality of cams connected to said diaphragm control to thereby and to control said driving means and said diaphragm when said diaphragm control is set to its additional setting range; a second set of cams, a first cam of said second set being connected to said first control to be actuated thereby, a second cam of said second set being connected to said second control to be actuated thereby, said cams of said second set being connected together whereby actuation of one of said cams of said second set actuates the other of said cams of said second set; means connecting said linkage means to said second set to be controlled in response to the combined setting of both of said cams of said second set to set said indicator member to a predetermined position; and switching means connected to both of said controls and to said exposure meter to shortcircuit said meter when one of said controls is set to a position within its associated scale and the other of said controls is set to a position beyond its associated scale.

References Cited by the Examiner
UNITED STATES PATENTS

| | | | |
|---|---|---|---|
| 3,087,396 | 4/1963 | Winkler | 95—10 |
| 3,094,501 | 6/1963 | Hutchinson | 95—10 |
| 3,182,575 | 5/1965 | Jakob | 95—10 |
| 3,213,772 | 10/1965 | Starp | 95—10 |

JOHN M. HORAN, *Examiner.*